US008096730B1

(12) United States Patent
Hollis

(10) Patent No.: US 8,096,730 B1
(45) Date of Patent: Jan. 17, 2012

(54) APPARATUS FOR LAYING CONCRETE METAL PIPES INVERTS AND METHOD FOR USING THE SAME

(76) Inventor: Alan Hollis, Valley, AL (US)

( * ) Notice: Subject to any disclaimer, the term of this patent is extended or adjusted under 35 U.S.C. 154(b) by 437 days.

(21) Appl. No.: 12/436,774

(22) Filed: May 6, 2009

Related U.S. Application Data

(60) Provisional application No. 61/050,851, filed on May 6, 2008.

(51) Int. Cl.
*E01F 5/00* (2006.01)
(52) U.S. Cl. ........ 405/124; 249/11; 405/118; 405/184.2
(58) Field of Classification Search .................. 405/118, 405/119, 124, 126, 268, 270, 184.1, 184.2; 249/10, 11, 12
See application file for complete search history.

(56) References Cited

U.S. PATENT DOCUMENTS

| | | | | | |
|---|---|---|---|---|---|
| 1,929,817 | A | * | 10/1933 | Helsing | 405/124 |
| 2,015,771 | A | * | 10/1935 | Waller | 405/118 |
| 3,959,977 | A | * | 6/1976 | Godbersen | 405/155 |
| 4,065,924 | A | * | 1/1978 | Young | 405/270 |
| 4,319,859 | A | * | 3/1982 | Wise | 405/268 |
| 4,360,293 | A | * | 11/1982 | Wade | 405/268 |
| 4,496,265 | A | * | 1/1985 | Fragale | 404/110 |
| 4,557,633 | A | * | 12/1985 | Dyck | 405/268 |
| 4,954,019 | A | * | 9/1990 | Giroux | 405/270 |
| 5,011,338 | A | * | 4/1991 | Giroux et al. | 405/268 |
| 5,102,267 | A | * | 4/1992 | Bell et al. | 405/268 |
| 5,160,221 | A | * | 11/1992 | Rohe et al. | 405/270 |
| 5,558,882 | A | * | 9/1996 | Ulmer | 405/150.1 |

OTHER PUBLICATIONS

New York State Department of Transportation Standard Specifications of May 4, 2006, §603, pp. 487-488.
California Department of Transportation report, 5.1.2.2.1 Invert Paving with Concrete, 3 pages.

* cited by examiner

*Primary Examiner* — Frederick L Lagman
(74) *Attorney, Agent, or Firm* — Smith Gambrell & Russell LLP

(57) ABSTRACT

An apparatus and method for repairing failed metal pipe inverts includes an apparatus for distributing concrete that is positioned at one entrance of the metal pipe invert. The apparatus includes a frame having a forward end and a rearward end. A trough is connected to the forward end, and a support arm is connected to said rearward end. One end of a chute traverses the trough, while the other is supported by the support arm. A scraper is to the chute to spread concrete distributed from the trough into the pipe invert. The concrete is poured into the chute and distributed into the trough. The apparatus is pulled through the metal pipe invert to distribute concrete from an opening in the trough onto the metal pipe invert. The scraper engages the concrete to selectively spread the concrete on the metal pipe invert and repair the invert.

19 Claims, 10 Drawing Sheets

APPARATUS FOR LAYING CONCRETE METAL PIPES INVERTS AND METHOD FOR USING THE SAME

CROSS REFERENCE TO RELATED PATENT APPLICATIONS

This application claims priority from U.S. Provisional Application Ser. No. 61/050,851, filed on May 6, 2008, said application being relied upon and incorporated herein by reference.

BACKGROUND OF THE INVENTION

Metal culverts have been used in building roads for a long time because metal pipe is lighter than concrete pipe and road crews needed special equipment to set heavier concrete pipes in road cuts. Metal pipes started as galvanized plates, which were bolted or riveted together. They later became rolled pipes which were fabricated at a plant and then installed in twenty-foot lengths to be jointed with a band to other twenty-foot segments to form a long culvert.

Metal pipe inverts will experience failure over time, which has been blamed on rust or corrosive soil conditions. Further analysis indicates that the failure is caused by continuous movement of sediment through the drain via drain water, effectively "sand blasting" or eroding the bottom of the pipe. Once protective elements have eroded portions of the pipe, then the pipe will rust.

Removing the metal pipes having failed inverts is an extraordinarily expensive and time consuming job. In particular, the soil must be removed to expose the pipe experiencing failure. The excavated hole must be wide enough to prevent further soil collapse. The bed must then be reworked, such as with crushed stone. The bed must be on an even stable grade to prevent pipe separation at the joints, and the replaced material must be compacted. Once that step is complete, base and pavement layers must then be replaced.

SUMMARY OF THE INVENTION

An apparatus and method for repairing failed metal pipe inverts is described herein. The apparatus includes a frame having a forward end and a rearward end. A trough is connected to the forward end, and a support arm is connected to said rearward end. One end of a chute traverses the trough, while the other is supported by the support arm. A scraper is to the chute to spread concrete distributed from the trough into the pipe invert.

In operation, the apparatus for distributing concrete that is positioned at one entrance of the metal pipe invert. The concrete is poured into the chute and distributed into the trough. The apparatus is pulled through the metal pipe invert to distribute concrete from an opening in the trough onto the metal pipe invert. The scraper engages the concrete to selectively spread the concrete on the metal pipe invert and repair the invert.

DETAILED DESCRIPTION OF THE PREFERRED EMBODIMENTS

Figure 1:
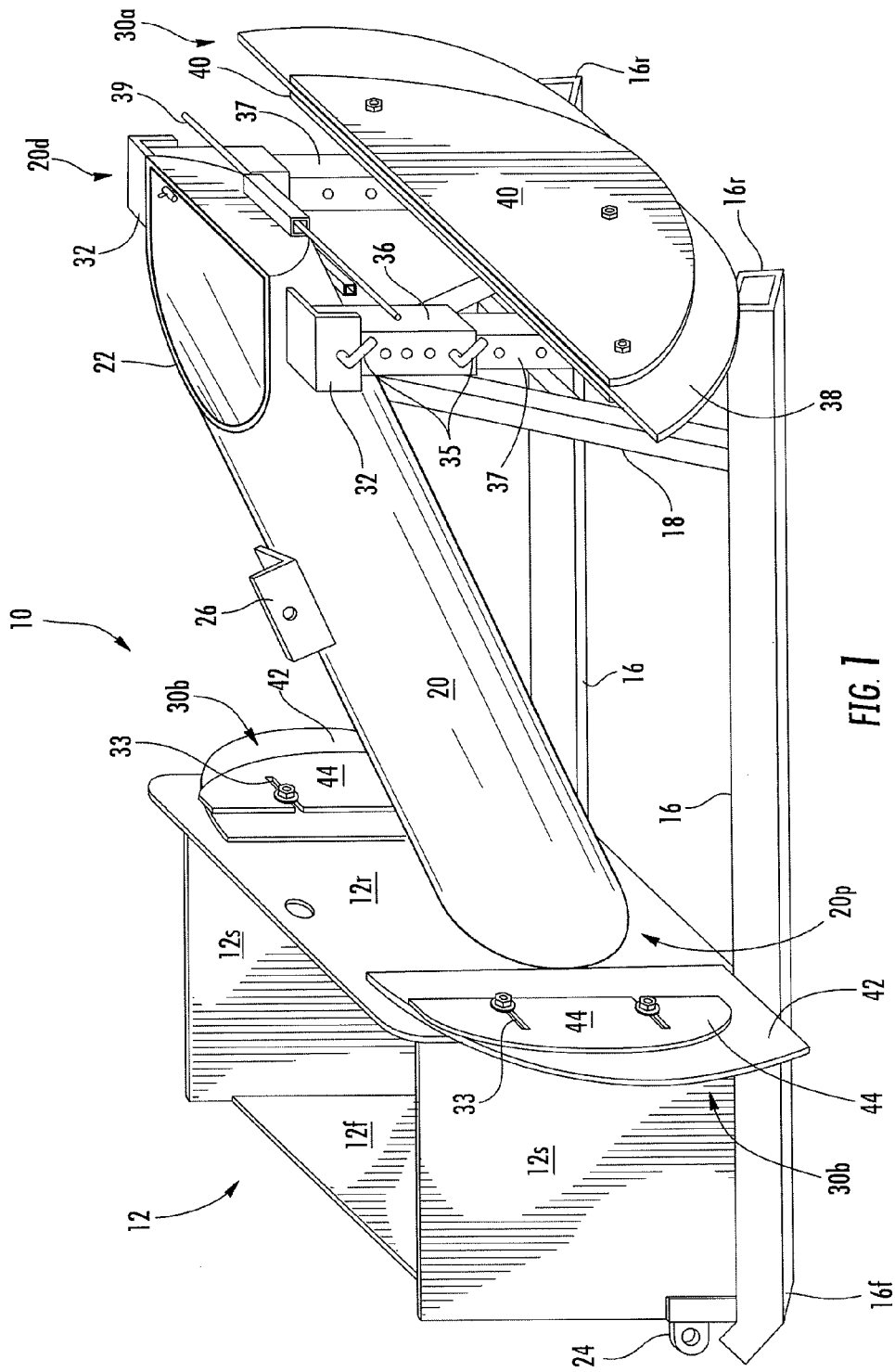
FIG. 1 is a perspective view of an apparatus for laying concrete on metal pipe inverts.

Referring now in detail to FIGS. 1-10, an apparatus 10 to lay concrete 6 on metal pipe inverts 8 is illustrated. The apparatus 10 includes a base frame 14, which in the illustrated embodiment includes a pair of spaced apart runners 16 that are connected to each other via one or more support arms 18. Each runner 16 has a forward end 16f and a rearward end 16r, with the support arms 18 connecting the runners 16 at the rearward end 16r. As shown in the embodiment illustrated, the support arms 18 form an A-frame between the runners 16, although it is foreseen that the support arms 18 may be designed according to any known shape useful for the present application.

The apparatus 10 further includes a trough or receptacle 12 that is mounted between both runners 16 of the frame 14 toward the forward end 16f of the runners 16. The trough 12 includes a forward wall 12f, a rearward wall 12r, two side walls 12s, and a floor 13 connected with the lower most edges of the walls 12f, 12r and 12s. It is foreseen that various configurations of the trough 12 beyond the box-shape illustrated in the attached drawings could be implemented by one having ordinary skill in the art to achieve the desired distribution of concrete 6 described herein.

The apparatus 10 additionally includes a chute 20, duct or other conduit having a distal end 20d and a proximal end 20p. In the embodiment illustrated, the chute 20 has a hollow cylindrical shape, with the proximal end 20p intersecting or connecting with the rearward wall 12r of the trough 12. The distal end 20d of the chute 20 is supported by the support arms 18 mounted on the runners 16.

Figure 2:
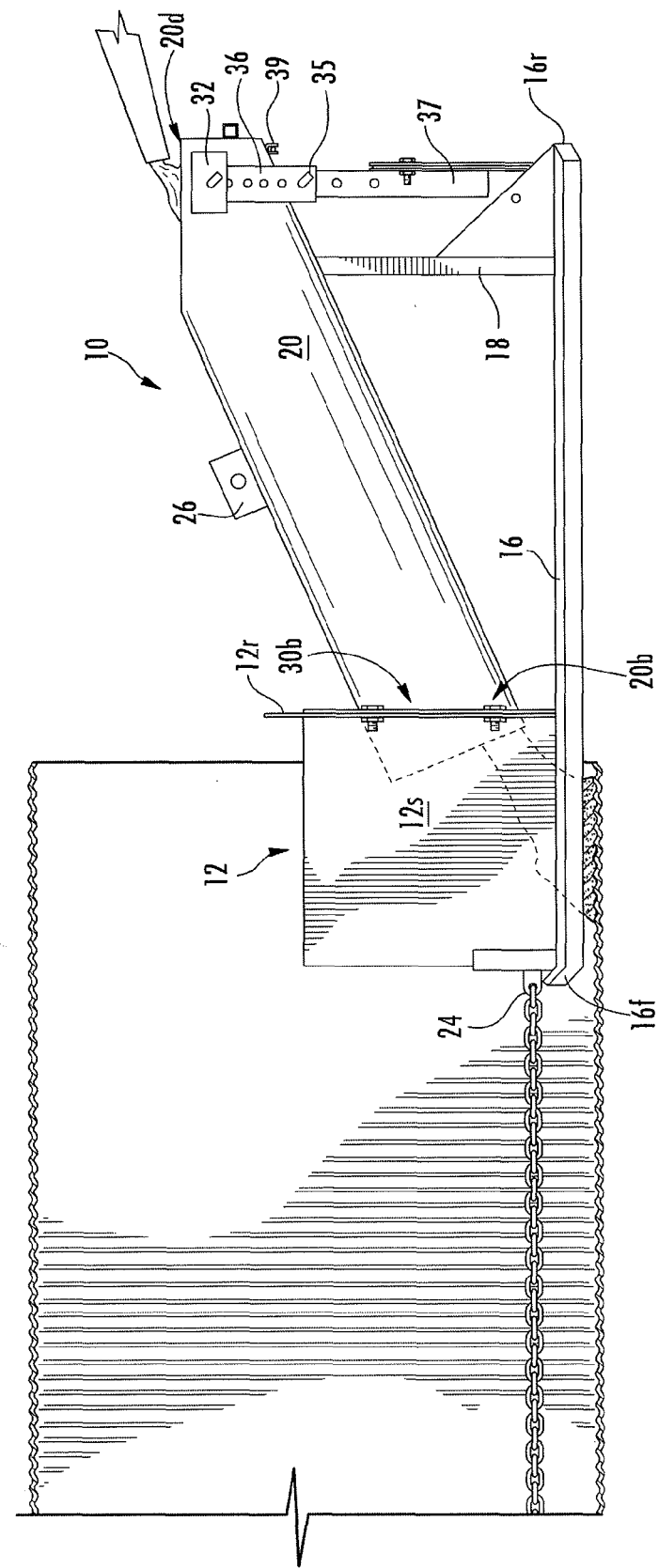
FIGS. 2 and 3 are side elevational view of the apparatus engaging a metal pipe invert.
Figure 3:
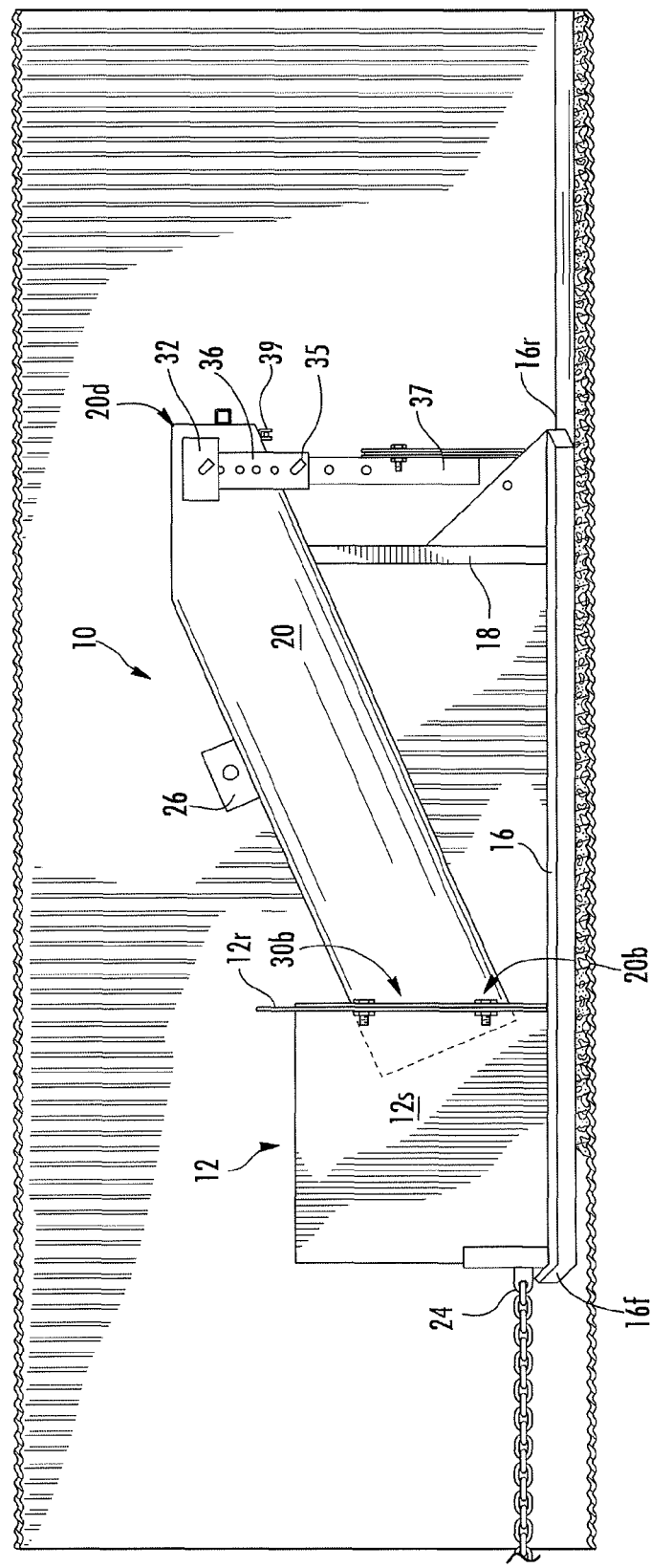
Figure 4:
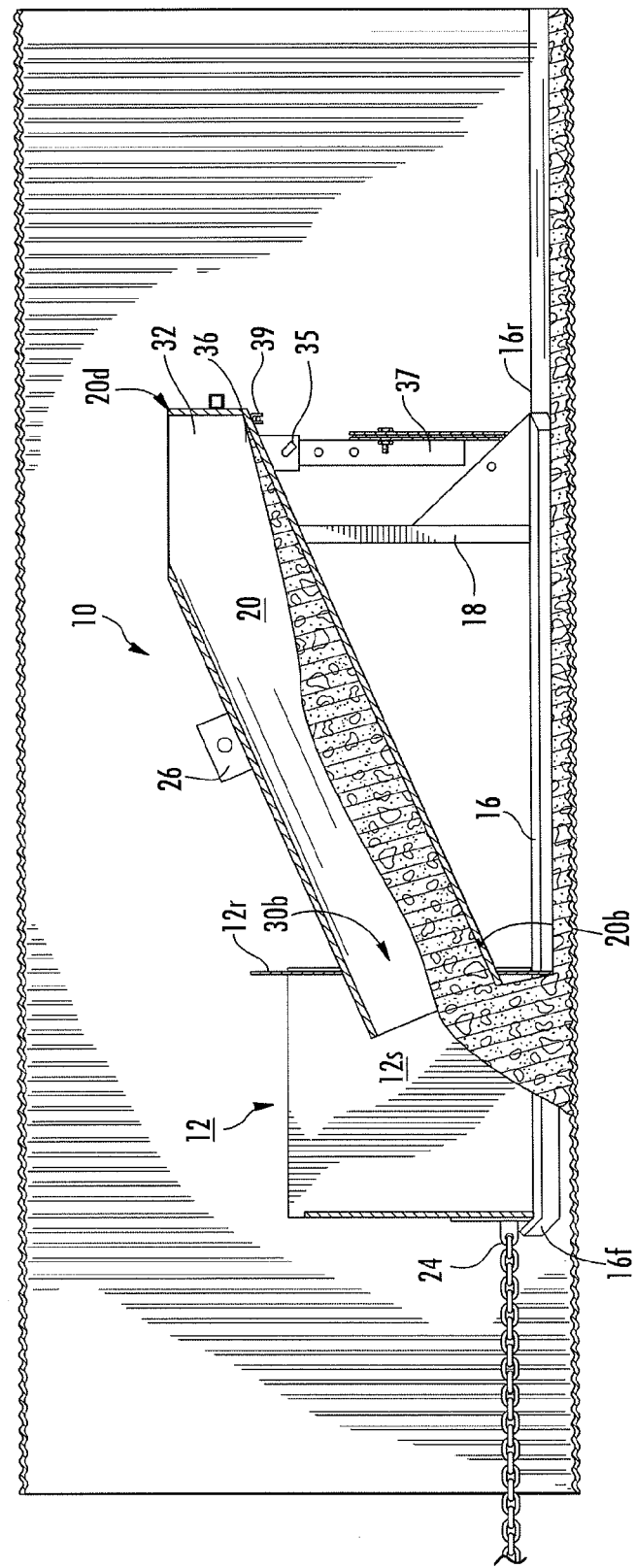
FIG. 4 is a side sectional view of the metal pipe invert illustrated in FIG. 3.
Figure 5A:
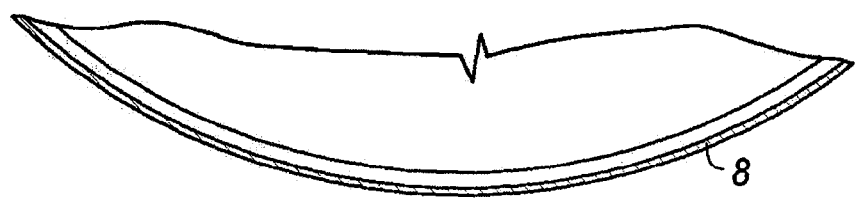
FIG. 5a is a cross-sectional view of the metal pipe invert.
Figure 5B:
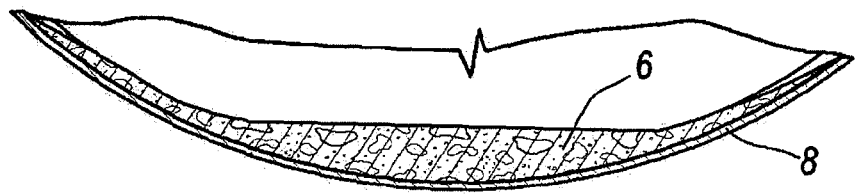
FIG. 5b is a cross-sectional view of the metal pipe invert treated with the apparatus.
Figure 6:
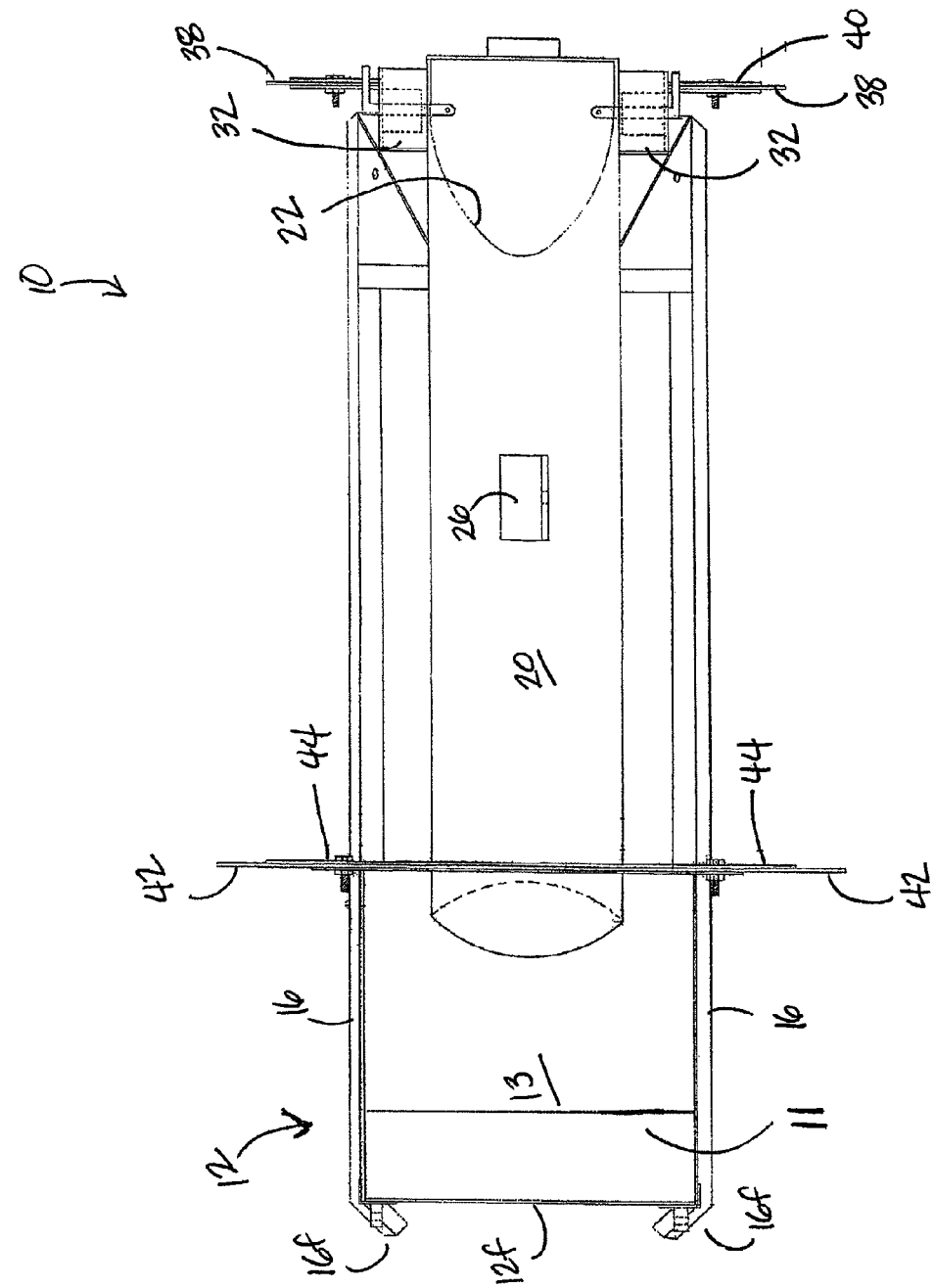
FIG. 6 is a top plan view of the apparatus.
Figure 7:
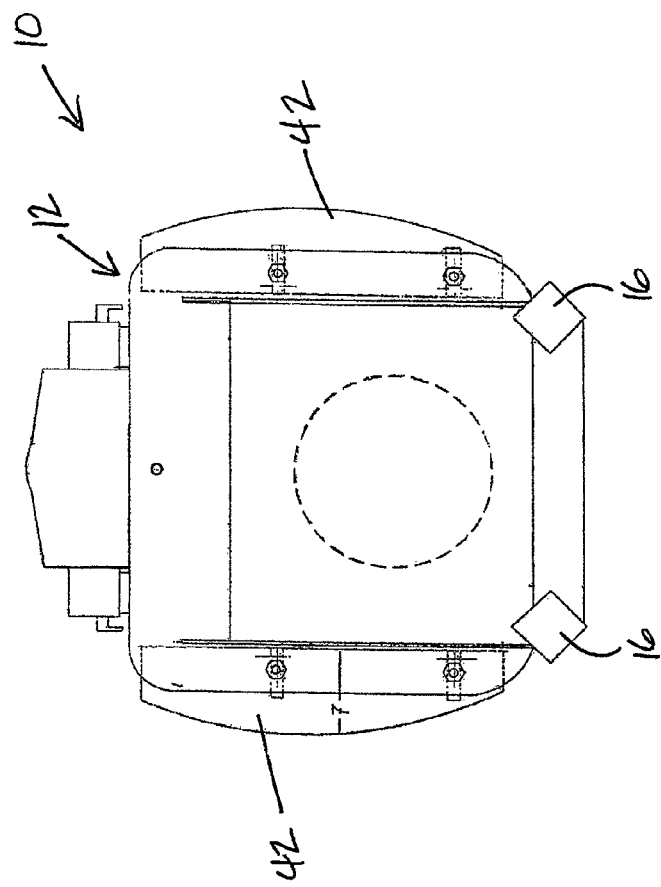
FIG. 7 is an elevational view of the forward end of the apparatus.
Figure 8:
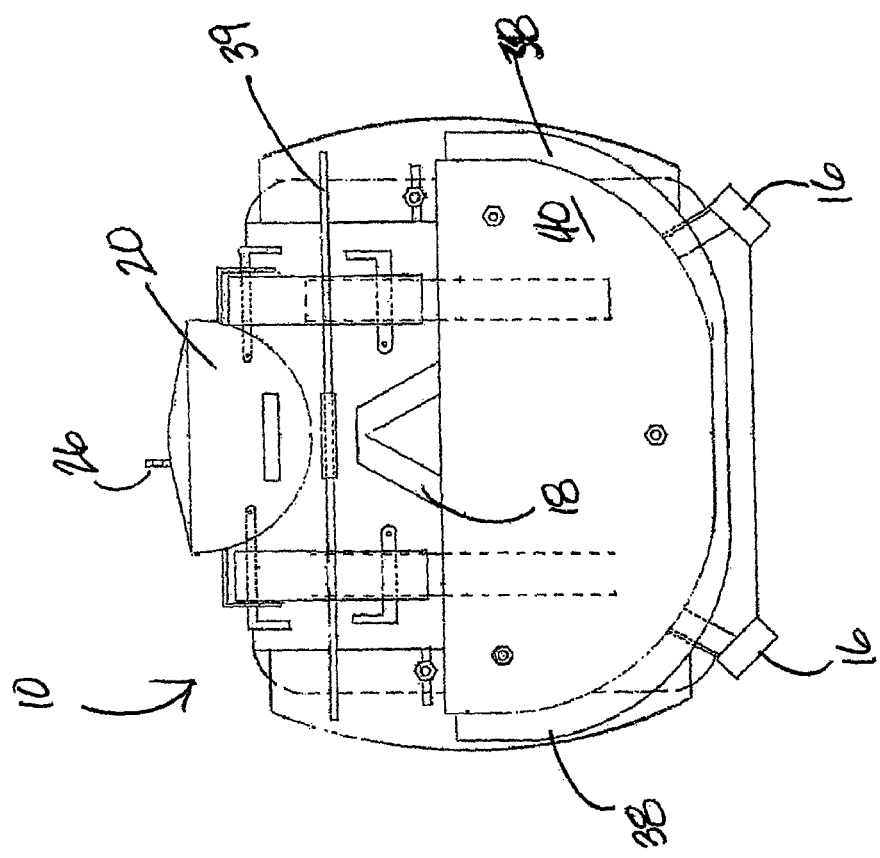
FIG. 8 is an elevational view of the rear end of the apparatus.
Figure 9:
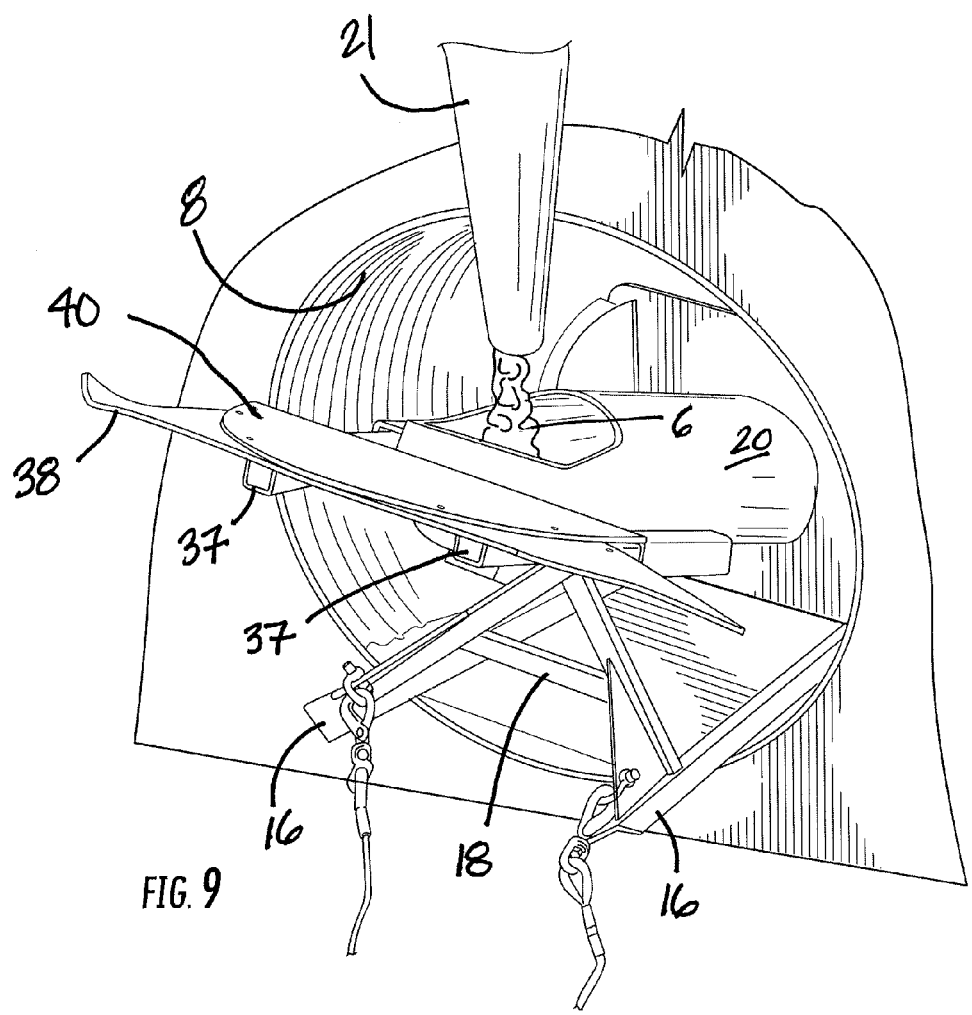
FIGS. 9 and 10 is a perspective view of the apparatus engaging a metal pipe invert.
Figure 10:
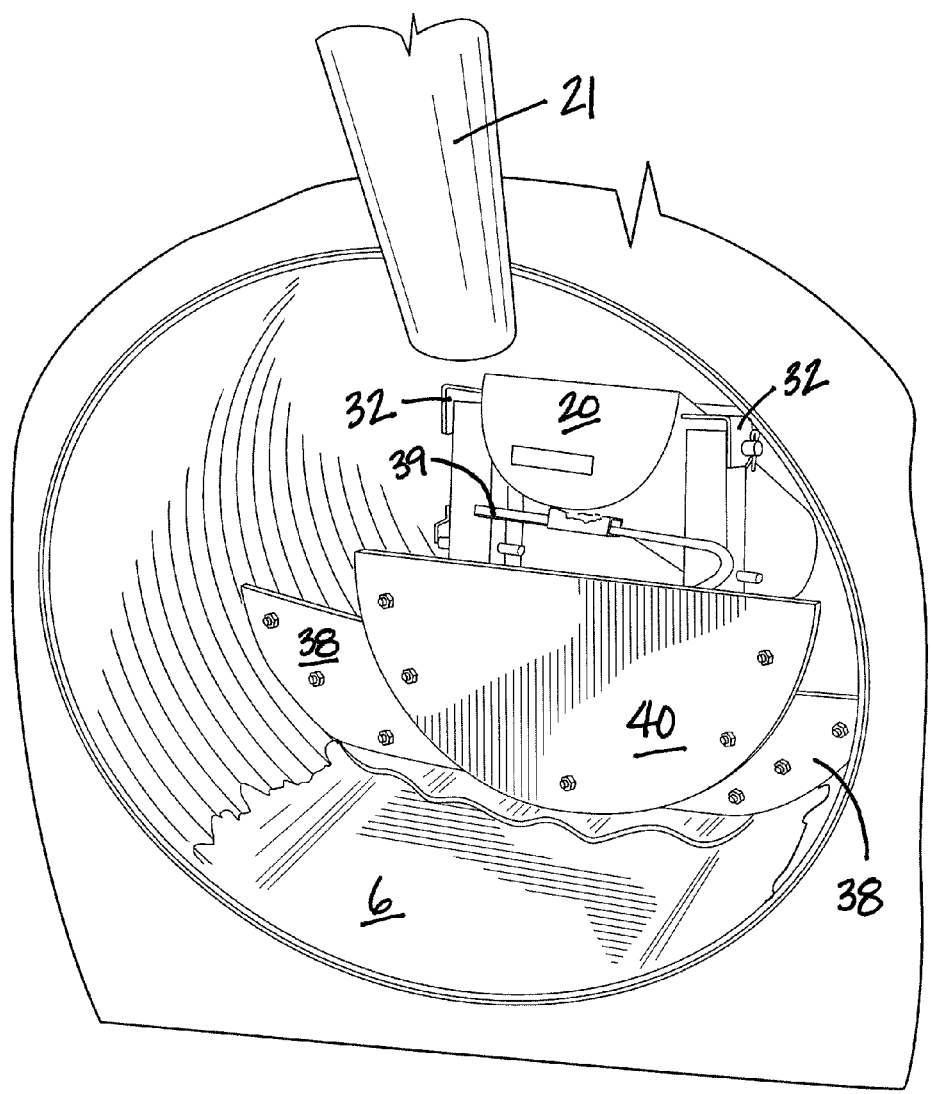

A recession 22 is defined in the distal end 20d of the chute 20 to receive cement 6 from a concrete mixer or other source 21 (see FIG. 2). Furthermore, the distal end 20d of the chute 20 is elevated by the support arms 18 above the proximal end 20p so that cement may be dispense into the chute 20 through the recession 22 and directed by gravity into the trough 12. The trough 12 includes an opening 11 traversing or proximate the floor 13 of the trough 12. The opening 11 may extend from runner 20 to runner 20, or it may have a varying shape. In addition, a supplemental plate (not shown) may be incorporated to vary the size of the opening 11. Similarly, the floor 13 adjacent the opening 11 may be positioned at an angle to assist the flow of concrete 6 on to the invert 8. In any case, the opening 11 is designed to allow the concrete 6 to pass through the floor 13 to the surface below the apparatus 10, which in operation is the metal pipe 8.

A pair of cable connectors 24 are attached to the forward wall 12f of the trough 12, and they may also be connected to the rearward end of the apparatus 10, such as on the support arms 18. A cable, chain, rope or similar embodiment may be linked to the connectors 24 to assist the user in moving the apparatus 10 back and forth in a substantially horizontal direction. In addition, a lift connector 26 is affixed to the chute 18, such that the apparatus 10 is able to be lifted and positioned using this connector 26.

The apparatus 10 additionally includes at least one scraping apparatus for controlling the dispersion of the concrete 6 in the metal invert. A first scraping apparatus 30a is attached to the distal end 20d of the chute 18. The first scraping apparatus 30a includes a pair of connectors, such as L-shaped arms 32, that are securely connected to opposite sides of the chute 18, such as by welding. A connecting aperture 34 extends through both L-shaped arms 32, and through the use of a pin 35, a support sleeve 36 is connected to the respective L-shaped arm 32.

The scraping assembly 30a additionally includes a primary flexible scraper flange or wings 38 that is connected to the support members 36. In the embodiment shown in the figures, the scraper flange 38 has somewhat of a semi-circular or semi-ellipse shape, with the width of the primary scraper 38 being greater than the width of the trough 12. That is, the primary scraper 38 has a contoured side edge and a substantially flat bottom edge. In this embodiment, the scraper 38 is sandwiched between two metal plates 40 that are connected with a support member 37. The scraper 38 is made of a flexible material (such as rubber) so that it will be able to bend when in contact with the metal pipe 8. The support member 37 will traverse or engage the support sleeve 36 so that the position of the support member 37 may be adjusted with respect to the sleeve 36 to determine the position of the scraper 38 with respect to the runners 16 and the metal invert 8.

In addition, a pivot bar or rod 39 may be mounted to the distal end 20d of the chute 20 to provide a supplemental means for adjusting the first scraping apparatus 30a. That is, the first scraping apparatus 30a may be pivotally connected to the rod 39 so that the first scraping apparatus 30a may pivot between a lowered position (see FIG. 1) and a raised position (see FIG. 9). In the lowered position, the first scraping apparatus 30a will engage the concrete 6 distributed in the invert 8, whereas in the raised position, the first scraping apparatus 30a will simply be displaced from the surface of the concrete 6.

Continuing to view FIG. 1, the apparatus 10 may include a supplemental scraping apparatus 30b connected to opposite sides of the trough 12. That is, the scraping apparatus 30b may be affixed to opposite sides of the rearward wall 12r of the trough 12. The supplemental scraping apparatus 30b includes a secondary scraper flange or wing 42 that is connected to each side of the rearward wall 12r using a respective secondary plate 44 and bolt or screw 45. The secondary scrapers 42 may be attached to the rearward wall 12r such that they extend outwardly from the trough 12 in opposite directions, with the secondary scrapers 42 engaging the side walls of the metal tube 8 as necessary. Because the scrapers 42 may be made of a somewhat flexible material (such as rubber), they will be able to bend as necessary for the apparatus 10 to traverse the metal invert 8. Furthermore, a substantially horizontal slit 33 extends through each supplemental scraping apparatus 30b, such that the position of the supplemental scraping apparatus 30b may be adjusted with respect to the pipe 8 as desired by simply loosening the screw or bolt 45 and adjusting the position of the secondary scraper flange 42 and secondary plate 44.

Placing concrete 6 in the failed metal pipe inverts 8 is a much faster and less expensive process than conventional replacement of the metal pipe 8. In operation, the concrete 6 from the mixer 21 is poured into the chute 20 through the recession 22, and thereby distributed into trough 12. The concrete 6 will temporarily be stored in the trough 12, and the apparatus 10 will be pulled through the metal pipe 8, with the forward end 16f initially leading the way through the pipe 8 the first time. The scrapers or wings 38 of the apparatus 10 will spread the concrete 6 as the apparatus 10 is pulled through the metal pipe 8. The concrete 6 will fill up the holes below the invert 8 as well as the lower portion of the pipe invert 8 (see FIG. 5a), and the concrete 6 will then be allowed to set. After the concrete 6 has set, the process will be repeated, and these steps will be followed until the complete bottom of the metal invert 8 is covered with concrete 6, such as 3000 PSI pea gravel mix with fibermesh.

In order to fill all of the failed invert 8 at the desired distribution, the user may make multiple pulls of the apparatus 10 through the metal pipe 8. That is, the rearward end 16r may be pulled back through the pipe 8, and then the forward end 16f will be pulled through one again. The last pass is with adjusted scrapers or wings 38 so the concrete 6 can be smoothed and pulled up the walls of the metal pipe 8. This gives a concrete bottom 6 for the water to run across during normal flow, and therefore the metal remains dry during this normal flow period. During rains or high water periods, the metal pipe 8 may fill up and carry the water load. After high flows recede, though, the water level will return to normal flow and the metal pipe 8 will dry.

The manpower needed for operation of the apparatus 10 will vary, but it is foreseen that it can be operated by two to three persons and take about one hour for typical operation in a standard pipe 8, which would include passing the apparatus 10 down and back a pipe 8 of standard length (approximately 20 feet), with one additional pass all the way through the pipe 8. During the first two pulls, the scrapers/wings 38 will be kept in an upright position. In the last pull through, the scrapers/wings 38 will be lowered and the user will simply pull the apparatus 10 all the way through the pipe 8.

The apparatus 10 may operate with pipes 8 of having various lengths and widths. In addition to the standard sized pipes 8 noted above, it can be used with pipes 8 having various diameters (e.g, 54-72 inch diameters) and having lengths of 60 to 90 feet and longer according to the length of the pipe laid. These dimensions are simply examples, and it is noted that the diameters and lengths of the pipes 8 may vary with the apparatus 10 still being able to operate properly. Furthermore, the dimensions of the apparatus 10 disclosed above and in the drawings may vary as necessary for the corresponding pipe 8.

While the invention has been shown and described in preferred forms, it will be apparent to those skilled in the art that many modifications, additions, and deletions can be made therein. For example, the footholds can be secured to the platform of the tree stand assembly. These and other changes can be made without departing from the spirit and scope of the invention as set forth in the following claims.

What is claimed is:

1. An apparatus for laying concrete in metal pipe inverts comprising:
    a frame including a pair of runners having a forward end and a rearward end;
    a trough connected between said runners proximate said forward end of said runners;
    at least one support arm connected to said runners opposite said trough;
    a concrete chute having a proximal end and a distal end, said proximal end traversing said trough and distal end supported by said at least one support arm; and
    a primary scraper adjustably connected to said distal end of said chute and selectively extending toward said runners to spread concrete distributed from said trough in the metal pipe invert.

2. The apparatus as described in claim 1 further comprising at least one secondary scraper affixed to said trough, said secondary scraper extending outwardly from said trough.

3. The apparatus as described in claim 2, wherein said secondary scraper is made of a somewhat flexible material.

4. The apparatus as described in claim 2, wherein said secondary scraper has a substantially arcuate outer edge and a substantially flat lower edge.

5. The apparatus as described in claim 1 further comprising a pair of secondary scrapers affixed to opposite sides of said trough, said scrapers extending outwardly from said trough.

6. The apparatus as described in claim 1 further comprising:
   at least one support sleeve connected to said distal end of said chute;
   a support member connected with said primary scraper and adjustably engaging said support sleeve to selectively alter the distance between said scraper and said chute.

7. The apparatus as described in claim 6 wherein said primary scraper has a substantially contoured side edge and a substantially flat bottom edge.

8. An apparatus for distributing concrete from an existing source of concrete onto an inner surface of a metal pipe invert, the apparatus comprising:
   a frame having a forward end and a rearward end;
   a receptacle having a base and surrounding wall, said receptacle connected to said forward end between said frame;
   at least one buttressing arm connected between said forward end of said frame;
   a duct having a proximal end traversing said trough and a distal end supported by said at least one buttressing arm; and
   a primary flange connected to said distal end of said duct to spread concrete distributed from said trough onto the pipe invert.

9. The apparatus as described in claim 8 further comprising at least one secondary scraper affixed to said receptacle, said secondary scraper extending outwardly from said receptacle.

10. The apparatus as described in claim 9, wherein said secondary scraper is made of a somewhat flexible material.

11. The apparatus as described in claim 9, wherein said secondary scraper has a substantially arcuate outer edge and a substantially flat lower edge.

12. The apparatus as described in claim 8 further comprising a pair of secondary scrapers affixed to opposite sides of said receptacle, said scrapers extending outwardly from said receptacle.

13. The apparatus as described in claim 8 further comprising:
   at least one support sleeve connected to said distal end of said duct;
   a support member connected with said primary scraper and adjustably engaging said support sleeve to selectively alter the distance between said scraper and said duct.

14. The apparatus as described in claim 13 wherein said primary scraper has a substantially contoured side edge and a substantially flat bottom edge.

15. The apparatus as described in claim 8 wherein said frame comprises a pair of runners.

16. A method for repairing failed metal pipe inverts comprising the steps of:
   a) positioning an apparatus for distributing concrete at one entrance of the metal pipe invert, said apparatus including a frame including a pair of runners having a forward end and a rearward end; a trough connected to said forward end between said runners, said trough having a base and surrounding wall, at least one support arm connected between said forward end of said runners, and a chute having a proximal end traversing said trough and a distal end supported by said at least one buttressing arm; and a flexible scraper connected to said distal end of said chute to spread concrete distributed from said trough into the pipe invert;
   b) pouring concrete into said chute from a source of concrete;
   c) distributing the concrete from said chute into said trough;
   d) driving said apparatus through the metal pipe invert in a first direction;
   e) distributing concrete from an opening in said trough onto the metal pipe invert; and
   f) engaging the concrete with the scraper to selectively spread the concrete on the metal pipe invert.

17. The method as described in claim 16, wherein after step f) comprising the step of driving said apparatus through the metal pipe invert in a second direction.

18. The method as described in claim 16 wherein step e) further comprises engaging the concrete with substantially semicircular flange having substantially contoured side edges and a substantially flat bottom edge.

19. The method as described in claim 16 further comprising the step of:
   engaging the concrete with at least one secondary scraper affixed to said trough.

* * * * *